Sept. 5, 1961        T. F. ZLOTEK        2,998,876

SPRAG FOR ONE-WAY CLUTCHES AND METHOD OF FORMING THE SAME

Filed June 2, 1958

INVENTOR.
THADDEUS F. ZLOTEK
BY
Whittemore Hulbut & Belknap
ATTORNEYS

United States Patent Office 2,998,876
Patented Sept. 5, 1961

2,998,876
SPRAG FOR ONE-WAY CLUTCHES AND
METHOD OF FORMING THE SAME
Thaddeus F. Zlotek, Detroit, Mich., assignor to Formsprag Company, Warren, Mich., a corporation of Michigan
Filed June 2, 1958, Ser. No. 739,090
4 Claims. (Cl. 192—45.1)

The invention relates to the manufacture of sprags for use in one-way clutches, for wedging and sliding engagement between races of a race structure, and more particularly those sprags designed for pivotal connection with a retainer such as constitutes part of the subject matter of my copending application, Serial No. 739,089, filed of even date herewith. It is the object of the invention to obtain a construction in which the pivot is integral with the sprag and is located alternatively adjacent to the outer or the inner race. Another object is to provide an improved sprag having a novel cross sectional contour for pivotal coaction with the retainer. A further object is to provide such a sprag which is characterized by end trunnions having novel coaction with energizing springs, as well as with the retainer. With these objects in view the invention consists in the construction and method of forming the same as hereinafter set forth.

Figure 1:
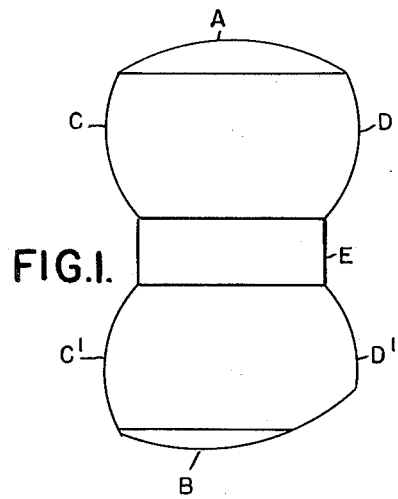
FIG. 1 is an enlarged end elevation of the extruded bar.

As shown in FIG. 1 the extruded bar from which the sprags are to be formed has circumferentially arcuate cam faces A and B of mild and generally similar degree of curvature for respectively engaging tangentially the outer and inner races (not shown) of a conventional annular race structure of the clutch. Adjacent to each of these faces the bar is formed to provide pairs of concentric, radially arcuate side faces C, D and C', D' along its axial length (and that of the sprag formed therefrom), which are spaced from each other by a central or metal narrower body portion E. The length of the arcs C, D and C', D' is sufficient for the tilting of the sprag the maximum distance between cooperating bearings in the retainer, which may be of the general type shown and described in my copending application, Serial No. 694,152, filed November 4, 1957, now Patent No. 2,917,146, granted December 15, 1959. The center of the arcuate face A is preferably located close to the center of gravity of the sprag to avoid disturbance thereof in the clutch by centrifugal force.

Figure 2:
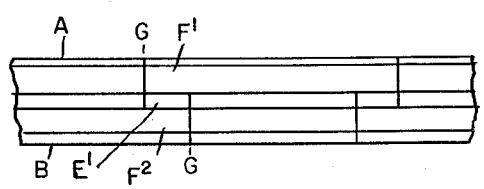
FIG. 2 is a side elevation of said bar illustrating the manner of forming trunnion pivots thereon.
Figure 3:
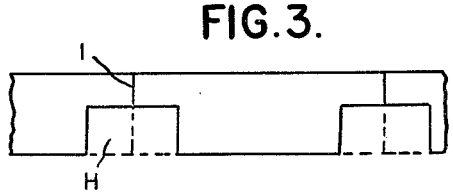
FIG. 3 is a similar view showing the pivots as formed to be adjacent to the outer race.
Figure 4:
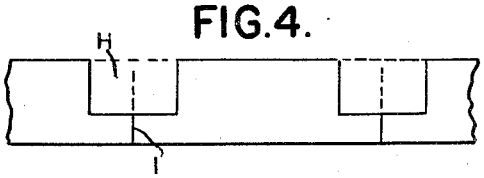
FIG. 4 is a similar view showing the pivots formed to be adjacent to the inner race.
Figure 5:
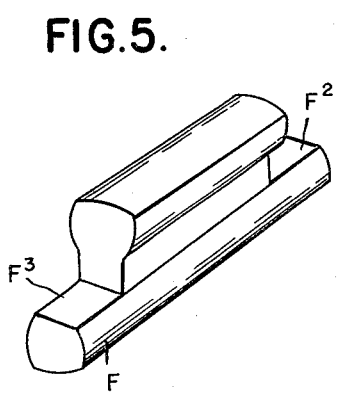
FIG. 5 is a perspective view of the construction shown in FIG. 4.
Figure 6:
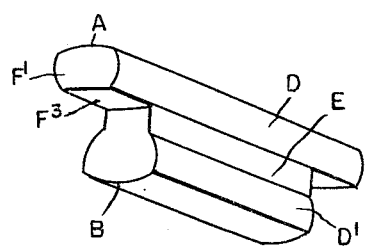
FIG. 6 is a similar view of the construction as in FIG. 3.

To form sprags from this bar, it is severed into lengths equal to the sprag proper plus trunnion pivots projecting from opposite ends thereof, as shown in FIGS. 5 and 6. One of the pairs of concentric arcuate portions and the portion of the sprag intermediate the same and the other pair is cut away so as to leave projecting only the portion of the latter pair. This will form a trunnion formation or pivot F for engagement with a suitable retainer (not shown). To conserve stock the severing of the bar may be, as shown in FIG. 2, along the line G—G so as to form a pivot or tilting formation or trunnion F' projecting from the upper portion of one sprag and an oppositely projecting trunnion F² from the adjacent portion of an adjoining sprag. The central portion E' between these projections is cut away. However, to form sprags with adjacent similar trunnions the bar may be cut away, as indicated at H (FIGS. 3 and 4), for a length equal to that of two trunnions before centrally severing the same at I. This cut away portion will include the other pair of concentric arcuate portions and the portion between the same and the trunnions. In FIG. 3 the trunnions are formed adjacent to the cam face for the outer race and in FIG. 4 they are formed of the portion adjacent to the inner race for coaction with retainers such as are shown and claimed in my copending application identified above. Sprags may thus be formed from the same stock bar having trunnions to be adjacent to either race as desired. The trunnions may be cut away transversely of said arcuate surfaces for clearance and the formation of a surface F³ at a suitable angle for cooperative engagement with energizing means. However if desired the opposite ends of the sprag portion may be notched to receive the energizing springs instead of using the trunnions.

What I claim as my invention is:

1. A sprag for one-way clutches adapted to be assembled and retained in a circumferential series with other like sprags, comprising an axially extending bar formed in a radial cross sectional contour to provide a medial portion of restricted circumferential extent and radially extending end portions on either side of said medial portion presenting radially oppositely facing curved cam surfaces, said end portions each having opposed radially extending side surfaces adjacent said respective first named surfaces, at least one of which side surfaces is of convexly outwardly curved contour across the radial dimension thereof, one of said end portions having integral extensions extending in opposite axial directions therefrom, said extensions affording trunnions for engagement with a suitable sprag retainer, said trunnion extensions each having a surface facing in the direction towards the opposite end portion of the sprag which is angled for radial engagement by an energizing spring to tilt and energize the sprag.

2. A sprag for one-way clutches adapted to be assembled and retained in a circumferential series with other like sprags, comprising an axially extending bar formed in a radial cross sectional contour to provide a medial portion of restricted circumferential extent and radially extending end portions on either side of said medial portion presenting radially oppositely facing curved cam surfaces, said end portions each having opposed radially extending side surfaces adjacent said respective first named surfaces, which side surfaces are of convexly outwardly curved contour across the radial dimension thereof, one of said end portions having integral extensions extending in opposite axial directions therefrom, said extensions affording trunnions for engagement with a suitable sprag retainer, said trunnion extensions each having a surface facing in the direction towards the opposite end portion of the sprag which is angled for radial engagement by an energizing spring to tilt and energize the sprag.

3. A sprag for one-way clutches adapted to be assembled and retained in a circumferential series with other like sprags, comprising an axially extending bar formed in a radial cross sectional contour to provide a medial portion of restricted circumferential extent and radially extending end portions on either side of said medial portion presenting radially oppositely facing curved cam surfaces, said end portions each having opposed, radially extending side surfaces adjacent said respective first named surfaces, which side surfaces are of convexly outwardly curved contour across the radial dimension thereof, one of said end portions having integral extensions extending in opposite axial directions therefrom and presenting axial continuations of the cam surface of said last named end portion, said extensions affording trunnions for engagement with a suitable sprag retainer at said curved side surfaces, said trunnion extensions each having a surface facing in the direction towards the opposite end portion of the sprag which is angled for radial engagement by an energizing spring to tilt and energize the sprag.

4. A sprag for one-way clutches adapted to be assembled and retained in a circumferential series with other like sprags, comprising an axially extending bar formed in a radial cross sectional contour to provide a medial portion of restricted circumferential extent and radially extending end portions on either side of said medial portion presenting radially oppositely facing curved cam surfaces, said end portions each having opposed, radially extending side surfaces adjacent said respective first named surfaces, which side surfaces are of convexly outwardly curved contour across the radial dimension thereof, one of said end portions having integral extensions extending in opposite axial directions therefrom and presenting axial continuations of the cam surface of said last named end portion, said extensions affording trunnions for engagement with a suitable sprag retainer at said curved side surfaces, said trunnion extensions each having a surface facing in the direction toward the opposite end portion of the sprag which is angled for radial engagement by an energizing spring to tilt and energize the sprag, the other end portion of the sprag being free of corresponding extensions.

References Cited in the file of this patent

UNITED STATES PATENTS

| | | |
|---|---|---|
| 1,694,377 | De Lavaud | Dec. 11, 1928 |
| 1,952,461 | Roos | Mar. 27, 1934 |
| 2,154,212 | Moorhouse | Apr. 11, 1939 |
| 2,385,799 | Dodge | Oct. 2, 1945 |
| 2,386,013 | Swenson | Oct. 2, 1945 |
| 2,431,411 | McKee | Nov. 25, 1947 |
| 2,446,692 | Collins | Aug. 10, 1948 |
| 2,542,914 | Farkas et al. | Feb. 20, 1951 |
| 2,740,190 | Szady | Apr. 3, 1956 |
| 2,760,259 | Troendly | Aug. 28, 1956 |
| 2,820,537 | Sauzedde | Jan. 21, 1958 |
| 2,824,636 | Troendly et al. | Feb. 25, 1958 |